United States Patent
Jacobs et al.

(10) Patent No.: US 8,946,544 B2
(45) Date of Patent: Feb. 3, 2015

(54) PHOTOVOLTAIC DEVICES INCLUDING COVER ELEMENTS, AND PHOTOVOLTAIC SYSTEMS, ARRAYS, ROOFS AND METHODS USING THEM

(75) Inventors: Gregory F. Jacobs, Oreland, PA (US); Wayne E. Shaw, Glen Mills, PA (US); Maryann C. Kenney, Foxboro, MA (US)

(73) Assignee: CertainTeed Corporation, Valley Forge, PA (US)

( * ) Notice: Subject to any disclaimer, the term of this patent is extended or adjusted under 35 U.S.C. 154(b) by 1943 days.

(21) Appl. No.: 12/145,166

(22) Filed: Jun. 24, 2008

(65) Prior Publication Data

US 2009/0000221 A1    Jan. 1, 2009

Related U.S. Application Data

(60) Provisional application No. 60/946,881, filed on Jun. 28, 2007.

(51) Int. Cl.
*H01L 31/042* (2014.01)
*H01L 31/00* (2006.01)
*H01L 31/048* (2014.01)

(52) U.S. Cl.
CPC ............. *H01L 31/0482* (2013.01); *Y02B 10/12* (2013.01); *Y02E 10/50* (2013.01)
USPC .......................................... 136/252; 136/244

(58) Field of Classification Search
USPC .................... 136/243, 244, 252, 259
See application file for complete search history.

(56) References Cited

U.S. PATENT DOCUMENTS

| | | | |
|---|---|---|---|
| 3,906,221 A | | 9/1975 | Mercier |
| 4,040,211 A | * | 8/1977 | Wotherspoon ................... 52/100 |
| 4,390,595 A | | 6/1983 | Yamagishi |
| 4,692,557 A | | 9/1987 | Samuelson et al. |
| 4,924,301 A | | 5/1990 | Surbrook |
| 5,124,178 A | | 6/1992 | Haenggi et al. |
| 5,303,525 A | | 4/1994 | Magee |
| 5,347,768 A | * | 9/1994 | Pineda .............................. 52/23 |

(Continued)

FOREIGN PATENT DOCUMENTS

| | | |
|---|---|---|
| FR | 2890181 | 3/2007 |
| JP | 7-30139 | 1/1995 |

(Continued)

OTHER PUBLICATIONS

Kurt Rossman "Absorption Spectrum of Polyethylene in the Near Infrared" Jounral of Chemical Physics vol. 23 p. 1355 (1955).*

(Continued)

*Primary Examiner* — Alexander Kollias
(74) *Attorney, Agent, or Firm* — McDonnell Boehnen Hulbert & Berghoff LLP

(57) ABSTRACT

The present invention provides a photovoltaic device having an active face, an active area on the active face and an operating wavelength range; and a cover element attached to the photovoltaic device and disposed over the active area of the active face of the photovoltaic element, the cover element having an opacity of at least about 25%. The present invention also provides photovoltaic systems, arrays, roofs and methods using such photovoltaic devices. In one embodiment of the invention, the photovoltaic device is a photovoltaic roofing element in which a photovoltaic element is integrated with a roofing substrate.

17 Claims, 3 Drawing Sheets

(56) References Cited

U.S. PATENT DOCUMENTS

| | | | |
|---|---|---|---|
| 5,421,909 A | 6/1995 | Ishikawa et al. | |
| 5,449,413 A * | 9/1995 | Beauchamp et al. | 136/257 |
| 5,474,620 A | 12/1995 | Nath et al. | |
| 5,604,626 A * | 2/1997 | Teowee et al. | 359/265 |
| 5,680,734 A | 10/1997 | Magee | |
| 5,700,332 A | 12/1997 | Brown et al. | |
| 5,725,006 A | 3/1998 | Kawama et al. | |
| 5,805,330 A * | 9/1998 | Byker et al. | 359/265 |
| 5,807,440 A | 9/1998 | Kubota et al. | |
| 5,953,877 A | 9/1999 | Kalkanoglu et al. | |
| 5,986,203 A | 11/1999 | Hanoka et al. | |
| 6,049,035 A | 4/2000 | Tsuri et al. | |
| 6,055,089 A * | 4/2000 | Schulz et al. | 359/270 |
| 6,093,581 A * | 7/2000 | Takabayashi | 438/64 |
| 6,118,572 A * | 9/2000 | Kostecki et al. | 359/265 |
| 6,149,757 A | 11/2000 | Chikaki et al. | |
| 6,232,544 B1 | 5/2001 | Takabayashi | |
| 6,237,288 B1 | 5/2001 | Jenkins et al. | |
| 626,855 A1 | 7/2001 | Kubota | |
| 6,268,558 B1 | 7/2001 | Kubota | |
| 6,355,132 B1 | 3/2002 | Becker et al. | |
| 6,455,347 B1 * | 9/2002 | Hiraishi et al. | 438/80 |
| 6,467,235 B2 | 10/2002 | Kalkanoglu et al. | |
| 6,523,316 B2 | 2/2003 | Stahl et al. | |
| 6,538,192 B1 | 3/2003 | Coster et al. | |
| 6,679,308 B2 | 1/2004 | Becker et al. | |
| 6,715,252 B2 | 4/2004 | Stahl et al. | |
| 7,118,794 B2 | 10/2006 | Kalkanoglu et al. | |
| 7,125,601 B1 | 10/2006 | Pinault et al. | |
| 7,227,078 B2 | 6/2007 | Jongerden et al. | |
| 2003/0178058 A1 | 9/2003 | Jongerden et al. | |
| 2005/0178428 A1 | 8/2005 | Laaly et al. | |
| 2005/0178429 A1 | 8/2005 | McCaskill et al. | |
| 2005/0178430 A1 | 8/2005 | McCaskill et al. | |
| 2006/0029775 A1 | 2/2006 | MacKinnon et al. | |
| 2006/0037639 A1 * | 2/2006 | Hihi | 136/246 |
| 2006/0266406 A1 | 11/2006 | Faust et al. | |
| 2008/0178928 A1 | 7/2008 | Warfield et al. | |

FOREIGN PATENT DOCUMENTS

| | | |
|---|---|---|
| WO | WO 92/06144 | 4/1992 |
| WO | WO 2005/078808 | 8/2005 |
| WO | WO 2005/091379 | 9/2005 |
| WO | WO 2005/111670 | 11/2005 |
| WO | WO 2006/121433 | 11/2006 |
| WO | WO 2007/064322 | 6/2007 |
| WO | WO 2007/085721 | 8/2007 |

OTHER PUBLICATIONS

Kuznetsov et al, Visible Light Absorption by Various Titanium Dioxide Specimens, Journal of Physical Chemistry B vol. 110 pp. 25203-25209 (2006).*
Peter A. Lewis "Pigment Handbook vol. I: Properties and Economics, 2nd Edition", John Wiley & Sons, New York, pp. 1-3 (1988).*
Harris, "Quantitative Chemical Analysis, 3rd Edition", W. H. Freeman and Company, New York, pp. 503 (1991).*
Nicoletta et al, Electrochromic Polymer-Dispersed Liquid-Crystal Film: A New Bifunctional Device, Advanced Functional Materials vol. 15, Issue 6, pp. 995-999, Jun. 2005.*
Deb et al, Stand-alone photovoltaic-powered electrochromic smart window, Electrochimica Acta vol. 46, Issues 13-14, Apr. 2, 2001, pp. 2125-2130.*
commonly owned and copending U.S. Appl. No. 11/456,200.
commonly owned and copending U.S. Appl. No. 11/743,073.
commonly owned and copending U.S. Appl. No. 11/747,909.

* cited by examiner

PHOTOVOLTAIC DEVICES INCLUDING COVER ELEMENTS, AND PHOTOVOLTAIC SYSTEMS, ARRAYS, ROOFS AND METHODS USING THEM

CROSS-REFERENCE TO RELATED APPLICATIONS

This application claims priority under 35 U.S.C. §119(e) to U.S. Provisional Patent Application Ser. No. 60/946,881, filed Jun. 28, 2007, which is hereby incorporated herein by reference in its entirety.

BACKGROUND OF THE INVENTION

1. Field of the Invention

The present invention relates generally to photovoltaic devices. The present invention relates more particularly to photovoltaic devices having cover elements providing control of the power generation of the photoelectric cells used therein.

2. Summary of the Related Art

The search for alternative sources of energy has been motivated by at least two factors. First, fossil fuels have become increasingly expensive due to increasing scarcity and unrest in areas rich in petroleum deposits. Second, there exists overwhelming concern about the effects of the combustion of fossil fuels on the environment due to factors such as air pollution (from $NO_x$, hydrocarbons and ozone) and global warming (from $CO_2$). In recent years, research and development attention has focused on harvesting energy from natural environmental sources such as wind, flowing water, and the sun. Of the three, the sun appears to be the most widely useful energy source across the continental United States; most locales get enough sunshine to make solar energy feasible.

Accordingly, there are now available components that convert light energy into electrical energy. Such "photovoltaic cells" are often made from semiconductor-type materials such as doped silicon in either single crystalline, polycrystalline, or amorphous form. The use of photovoltaic cells on roofs is becoming increasingly common, especially as device performance has improved. They can be used to provide at least a significant fraction of the electrical energy needed for a building's overall function; or they can be used to power one or more particular devices, such as exterior lighting systems.

Radiation generates voltage in a photovoltaic cell regardless of whether the cell is fully integrated into a photovoltaic power system. The voltage of a single photovoltaic cell generally is insufficient to cause an injury hazard for an installer. However, in use on a roof, tens or even hundreds of photovoltaic cells are electrically connected in series in order to build up a desirably high voltage; and multiple groups of series-connected photovoltaic cells are electrically-connected in parallel, in order to build up a desirably high current. Accordingly, installers can be subject to dangerous electrical hazards when installing photovoltaic cells on roofs during daylight hours.

SUMMARY OF THE INVENTION

The inventors have realized there is a need for photovoltaic devices that can be installed safely and can more controllably address variable illumination and excessive photovoltaic cell temperature.

One aspect of the present invention is a photovoltaic device comprising:

a photovoltaic element having an active face, an active area on the active face and an operating wavelength range; and a cover element attached to the photovoltaic device and disposed over the active area of the active face of the photovoltaic element, the cover element having an opacity of at least about 25%.

In another aspect of the invention, the photovoltaic device described above further includes a roofing substrate having a top face and a bottom face, and the photovoltaic element is disposed on or within a roofing substrate.

Another aspect of the invention is an array of photovoltaic devices as described above.

Another aspect of the invention is a roof comprising one or more photovoltaic devices as described above attached to a roof deck.

Another aspect of the invention is a method of installing a roof, comprising:

first,
   attaching one or more photovoltaic devices to a roof deck, each photovoltaic device comprising:
      a photovoltaic element having a photovoltaic cell, a first electrical lead and a second electrical lead attached to the photovoltaic cell, an active face and an operating wavelength range; and
      a high opacity cover element removably attached to the photovoltaic device and disposed over the active face of the photovoltaic element; and
   connecting the first electrical lead and second electrical lead of each photovoltaic device to an electrical system; and then, removing the high opacity cover sheet from each photovoltaic device.

Another aspect of the invention is a photovoltaic system comprising:

one or more photovoltaic devices, each photovoltaic device comprising:
   a photovoltaic element having an active face and an operating wavelength range, and
   a cover element attached to the photovoltaic device and disposed over the active area of the active face of the photovoltaic element, the cover element comprising an electrochromic material disposed over the active area of the active face of the photovoltaic element, a first electrode and a second electrode wherein the electrochromic material is disposed between the first electrode and the second electrode, and wherein the electrochromic material has at least 25% opacity in an electric field-free state or in the presence of an electric field; and an electrical switching system connected to each cover element through its first electrode and second electrode, and configured to adjust the opacity of the electrochromic material.

Another aspect of the invention is a roof comprising the photovoltaic system described above attached to a roof deck.

The photovoltaic devices, photovoltaic systems, arrays, roofs and methods of the present invention result in a number of advantages over prior art methods. For example, photovoltaic devices of the present invention can allow for installation and repair without subjecting the worker to hazardous electrical conditions. Moreover, photovoltaic devices and photovoltaic systems of the present invention can be adjusted so that they operate at or near the maximum power condition of their photovoltaic cells, thereby maximizing efficiency and power generation.

The accompanying drawings are not necessarily to scale, and sizes of various elements can be distorted for clarity.

DETAILED DESCRIPTION OF THE INVENTION

The voltage and, hence, power output of a photovoltaic cell depends strongly on the intensity of the radiation to which it is exposed. Accordingly, as illumination conditions fluctuate with cloud cover, season, time of day and the appearance or disappearance of shade-providing structures, the power output of the photovoltaic cell will fluctuate. Such fluctuation is often undesirable from the perspective of electrical system design.

Figure 1:
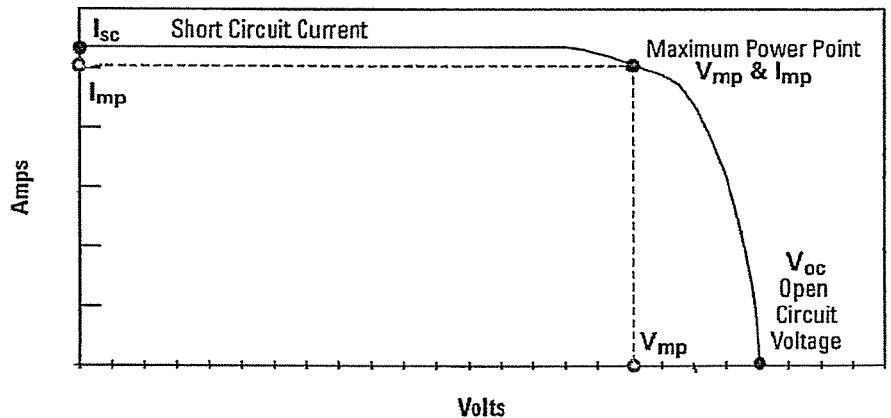
FIG. 1. is an i-V curve for a typical photovoltaic cell.
Figure 2:
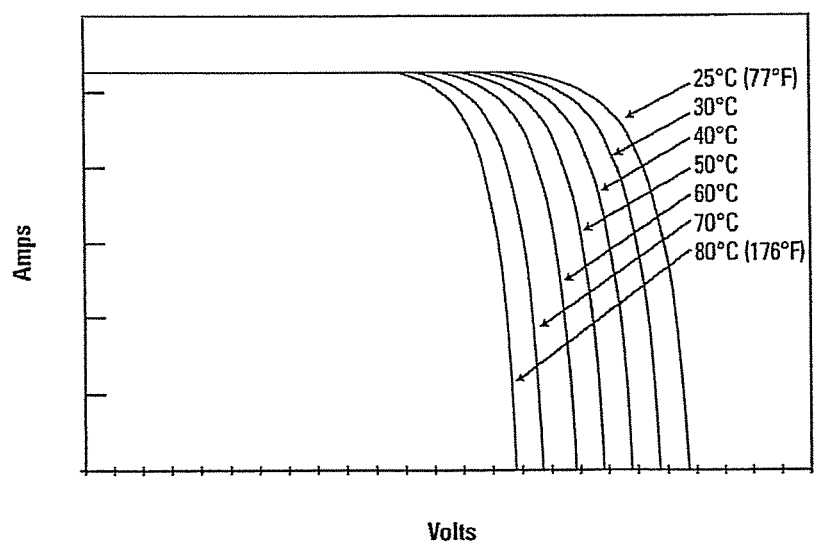
FIG. 2 is a set of i-V curves for a typical photovoltaic cell at a variety of temperatures.

Moreover, as the temperature of a photovoltaic cell increases, its power output drops. The graph of FIG. 1 is an i-V curve for a typical photovoltaic cell, showing the approximate location of the maximum power point. The graph of FIG. 2 shows a series of i-V curves for a typical photovoltaic cell; the skilled artisan will appreciate that as the temperature of the photovoltaic cell increases, the maximum power point shifts to lower voltages. Because the power generated by a photovoltaic cell is the product of its operating voltage and its operating current, as the maximum power point shifts to lower voltages the maximum power generated by the cell decreases.

One aspect of the invention is a photovoltaic device. One example of a photovoltaic device according to this aspect of the invention is shown in schematic cross-sectional view in FIG. 3. Photovoltaic device 300 includes a photovoltaic element 302, which has an active face 304 and an operating wavelength range. Photovoltaic element 302 has one photovoltaic cell or multiple photovoltaic cells that can be individually electrically connected so as to operate as a single unit.

Photovoltaic element 302 can be based on any desirable photovoltaic material system, such as monocrystalline silicon; polycrystalline silicon; amorphous silicon; III-V materials such as indium gallium nitride; II-VI materials such as cadmium telluride; and more complex chalcogenides (group VI) and pnicogenides (group V) such as copper indium diselenide. For example, one type of suitable photovoltaic element includes an n-type silicon layer (doped with an electron donor such as phosphorus) oriented toward incident solar radiation on top of a p-type silicon layer (doped with an electron acceptor, such as boron), sandwiched between a pair of electrically-conductive electrode layers. Photovoltaic element 302 can also include structural elements such as a substrate such as an ETFE or polyester backing; a glass plate; or an asphalt non-woven glass reinforced laminate such as those used in the manufacture of asphalt roofing shingles; one or more protectant or encapsulant materials such as EVA or ETFE; one or more covering materials such as glass or plastic; mounting structures such as clips, holes, or tabs; and one or more optionally connectorized electrical cables. Thin film photovoltaic materials and flexible photovoltaic materials can be used in the construction of photovoltaic elements for use in the present invention. In one embodiment of the invention, the photovoltaic element is a monocrystalline silicon photovoltaic element or a polycrystalline silicon photovoltaic element.

Photovoltaic element 302 can include at least one antireflection coating, disposed on, for example, the very top surface of the photoelectric element or between individual protectant, encapsulant or protective layers.

Suitable photovoltaic elements can be obtained, for example, from China Electric Equipment Group of Nanjing, China, as well as from several domestic suppliers such as Uni-Solar, Sharp, Shell Solar, BP Solar, USFC, FirstSolar, General Electric, Schott Solar, Evergreen Solar and Global Solar.

Active face 304 of photovoltaic element 302 is the face presenting the photoelectrically-active areas of its one or more photoelectric cells. The active face can be the top surface of the one or more photovoltaic cells themselves or can be the top surface of a series of one or more protectant, encapsulant and/or covering materials disposed thereon. During use of the photovoltaic device 300, active face 304 should be oriented so that it is illuminated by solar radiation. The active face 304 has on it an active area 306, which is the area in which radiation striking the active face will be received by the photovoltaic cell(s) of the photovoltaic element 302.

Figure 4:
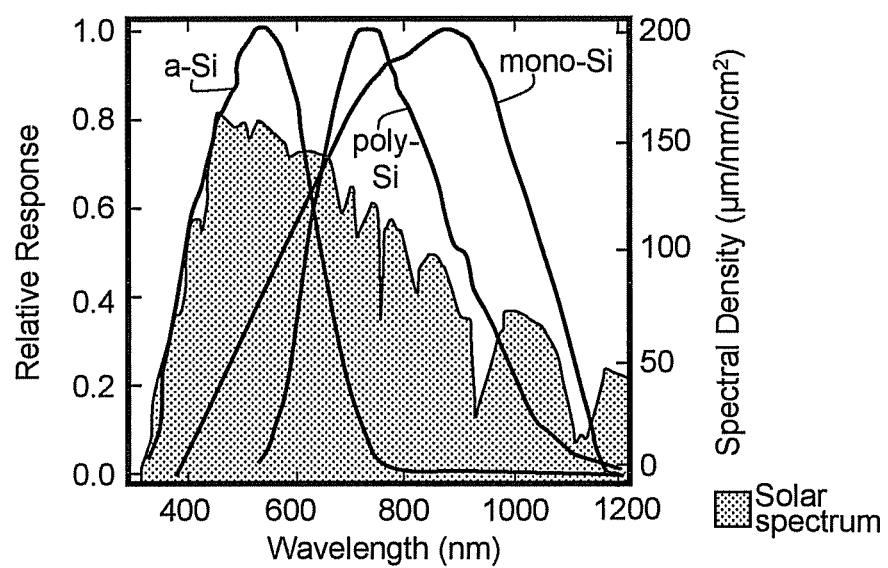
FIG. 4 is a graph showing the relative spectral response of three silicon-based photovoltaic materials as well as the spectral content of solar radiation.

The photovoltaic element 302 also has an operating wavelength range. Solar radiation includes light of wavelengths spanning the near UV, the visible, and the near infrared spectra. As used herein, the term "solar radiation," when used without further elaboration means radiation in the wavelength range of 300 nm to 1500 nm, inclusive. Different photovoltaic elements have different power generation efficiencies with respect to different parts of the solar spectrum. FIG. 4 is a graph showing the relative spectral response of three commonly-used photovoltaic materials as well as the spectral distribution of solar radiation. Amorphous doped silicon is most efficient at visible wavelengths, and polycrystalline doped silicon and monocrystalline doped silicon are most efficient at near-infrared wavelengths. As used herein, the operating wavelength range of a photovoltaic element is the wavelength range over which the relative spectral response is at least 10% of the maximal spectral response. According to certain embodiments of the invention, the operating wavelength range of the photovoltaic element falls within the range of about 300 nm to about 2000 nm. Preferably, the operating wavelength range of the photovoltaic element falls within the range of about 300 nm to about 1200 nm. For example, for photovoltaic devices having photovoltaic cells based on typical amorphous silicon materials the operating wavelength range is between about 375 nm and about 775 nm; for typical polycrystalline silicon materials the operating wavelength range is between about 600 nm and about 1050 nm; and for typical monocrystalline silicon materials the operating wavelength range is between about 425 nm and about 1175 nm.

Figure 3:
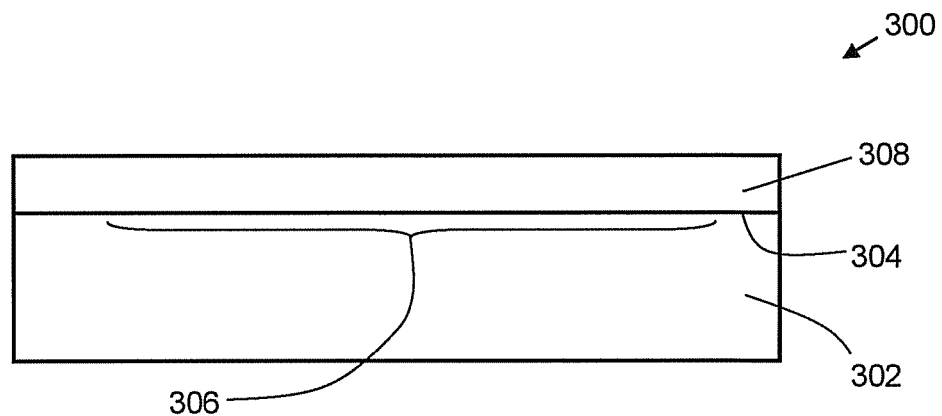
FIG. 3 is a schematic cross-sectional view of a photovoltaic device according to one aspect of the invention.

As shown in FIG. 3, photovoltaic device 300 also includes a cover element 308. The cover element is attached to the photovoltaic device 300 and is disposed over the active area of the active face of the photovoltaic element. The cover element has an opacity of at least 25%. As used herein, "opacity" refers to the fraction of solar energy within the operating wavelength range that the cover element prevents from reaching the active area of the active face of the photovoltaic element. For example, a cover element that allows 52% of solar energy within the operating wavelength range to reach the active area of the active face of the photovoltaic element (e.g., by reflecting 30% and absorbing 18%) has an opacity of 48%. The opacity at every wavelength within the operating wavelength range need not be at least about 25%, as long as the total energy within the operating wavelength range prevented from reaching the active area is at least about 25%. In certain embodiments of the invention, the cover element has an opacity of at least about 50%. In certain especially desirable embodiments of the invention, the cover element has an opacity of at least about 90%, or even at least about 95%.

In certain embodiments of the invention, the cover element substantially covers the active area of the active face of the photovoltaic element. However, in other embodiments of the invention, the cover element only partially covers the active area of the active face of the photovoltaic element. For example, a completely opaque cover element that covers only 50% of the active area would have an opacity of 50%.

The cover elements of the present invention are desirably thick enough to provide the desired opacity as well as any other desired properties (e.g., mechanical strength, weatherproofness), but thin enough not to adversely affect the desired size and shape of the photovoltaic roofing device. For example, in one embodiment of the invention, the cover element has a thickness in the range of about 25 μm to about 2 mm. In certain desirable embodiments of the invention, the cover element has a thickness in the range of about 75 μm to about 1 mm.

In certain embodiments of the invention, the cover element has an opacity of at least about 25%, but no greater than about 98%. Such cover elements can be useful in situations where the skilled artisan desires to reduce but not completely eliminate the power output of the photovoltaic device (e.g., in order to equalize the power performance of photovoltaic devices on different parts of a roof or to balance power generation and cell temperature in accordance with the graphs of FIGS. 1 and 2). In such embodiments of the invention, the cover element can include, for example, a layer of a partially transmissive material. Examples of partially transmissive materials include polymeric materials filled with a small amount of carbon black, dye or opaque pigment, and glass materials with metallic particles formed therein. Alternatively, the cover element can include a substantially transmissive material having a partially transmissive coating formed thereon. For example, the cover element can include a polymeric film or glass sheet having an interference filter or a very thin layer of metal formed theron. In other embodiments of the invention, the cover element does not completely cover the active area of the active face. The cover element can be made from any desirable material, and can include a single or multiple layers. The cover element can include one or more layers designed to provide other functionality, such as mechanical protection or weatherproofing.

According to one embodiment of the invention, the cover element has a substantially neutral optical density over the operating wavelength. Such cover elements can be constructed, for example, using metallic particles, carbon black, or a thin metallic layer. According to another embodiment of the invention, the cover element has a variable optical density over the operating wavelength. For example, the cover element can have different opacity at the shorter wavelengths of the operating wavelength range than it does at longer wavelengths. Alternatively, the cover element can have a range of wavelengths within the operating wavelength range for which it has a substantially lower or higher opacity than it does over the remainder of the operating wavelength range. Cover elements having variable optical density can be constructed, for example, using a colored pigment or dye or an interference filter.

In one embodiment of the invention, the cover element is substantially uniform in optical density over its area. In other embodiments of the invention, the cover element varies in optical density over its area. For example, in one embodiment of the invention, the cover element has a pattern of regions of high and low opacity; the overall opacity of the cover element would be a function of the individual opacities and relative areas of each. For example, a checkerboard pattern of opaque and transmissive regions would have an opacity of about 50%.

According to another embodiment of the invention, the cover element is colored. As used herein, an item that is "colored" is one that appears colored (including white, black or grey, but not colorless) to a human observer. According to one embodiment of the invention, the cover element includes (either at one of its surfaces or within it) a near infrared transmissive multilayer interference coating designed to reflect radiation within a desired portion of the visible spectrum. In another embodiment of the invention, the cover element includes (either at one of its surfaces or within it) one or more colorants (e.g., dyes or pigments) that absorb at least some visible radiation but substantially transmit near-infrared radiation. The color(s) and distribution of the colorants can be selected so that the photovoltaic device has an appearance that matches, harmonizes with and/or complements a desired type of roofing material, such as asphalt shingles of a given color and design. The pattern of colorant can be, for example, uniform, or can be mottled in appearance. Ink jet printing, lithography, or similar technologies can be used to provide a pattern of colorant that approximates the appearance of the roofing materials to be used in conjunction with the photovoltaic device (e.g., granule-coated asphalt shingles). Photovoltaic devices made with colored polymer structures are described in further detail in U.S. patent application Ser. No. 11/456,200, filed on Jul. 8, 2006 and entitled "Photovoltaic Device" (published as US 2008/0006323 A1 on Jan. 10, 2008), which is hereby incorporated herein by reference in its entirety. Moreover, the use of granules on the top surface of the cover element can also help provide the desired opacity and approximate the appearance of roofing materials to be used in conjunction with the photovoltaic device. The granules can be, for example, ceramic-coated inorganic particles optionally colored with metal oxides, such as those used on asphalt roofing shingles. The use of granules is described in further detail in U.S. patent application Ser. No. 11/742,909, filed on May 1, 2007 and entitled "Photovoltaic Devices and Photovoltaic Roofing Elements Including Granules, and Roofs Using Them," which is hereby incorporated herein by reference in its entirety.

In another embodiment of the invention, the cover element has a high opacity to solar radiation in the operating wavelength. For example, in certain embodiments of the invention, the cover element has an opacity of at least about 95%, at least about 98%, at least about 99%, or even at least about 99.5% to solar radiation in the operating wavelength. Such a cover element would not allow solar radiation to illuminate the photovoltaic element, and therefore would prevent the photovoltaic element from generating power. Such a cover element could be desirable for use during the installation or repair of photovoltaic elements because it would prevent the exposure of the installer/repairperson to dangerous electrical conditions. Such cover elements can be made, for example, using a polymer layer made substantially opaque with pigment or dye; a polymer layer coated with a layer of metal thick enough to be substantially opaque; a metal sheet or foil; or some other substantially opaque material such as paper or fabric. The cover element can include one or more layers designed to provide other functionality, such as mechanical strength or protection or weatherproofing. For example, in one embodiment of the invention, the cover element includes a protective polymer layer over an opaque layer such as a metal foil. In another embodiment of the invention, the cover element can provide mechanical protection to the photovoltaic element, enabling more robust or rugged handling than a similar photovoltaic element not so equipped.

Of course, a cover element having a high opacity would not be desirable during normal operation of the photovoltaic element; accordingly, such a cover element would be removably attached to the photovoltaic device. The high opacity cover element can be removably attached to the photovoltaic element itself, for example using a non-permanent adhesive. In another embodiment of the invention, the high opacity cover element has a plastic surface, and is removably attached to the photovoltaic element by static electricity forces. In one embodiment of the invention, the high opacity cover element can be attached to the photovoltaic element on the active area of the active face. However, in certain other embodiments of the invention, it is not attached directly to the active area of the active face of the photovoltaic element itself, but rather is attached to another part of the photovoltaic element, or even another part of the photovoltaic device (e.g., a roofing substrate on which the photovoltaic element is disposed, described in more detail below). Such embodiments of the invention may be desirable in that they keep the active area of the active face of the photovoltaic element free of adhesive that might discolor or otherwise interfere with illumination of the photovoltaic element. One or more layers of the cover element can provide mechanical strength to the cover element to keep it from tearing or breaking during its removal, described below.

In some embodiments of the invention, the cover element is flexible, and includes a graspable tab not attached directly to the photovoltaic device. After installation, the installer can grasp the graspable tab and peel the flexible cover element away from the photovoltaic element, exposing it and thereby starting the generation of power. The tab can be made from the same material(s) as the rest of the cover element, or can alternatively be made from a separate material such as plastic. The high opacity cover elements of the present invention can be printed, for example, with a decorative pattern, installation or advertising information, or a trademarked name, image or device.

Figure 5:
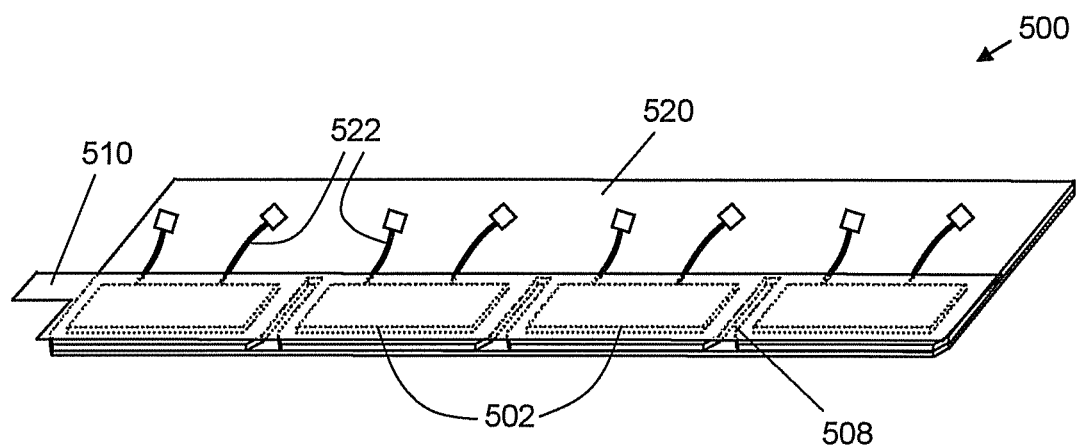
FIG. 5 is a schematic top perspective view of a photovoltaic device according to one embodiment of the invention.

An example of a photovoltaic device according to one embodiment of the invention is shown in FIG. 5. The photovoltaic device 500 includes a roofing substrate 520 having four photovoltaic elements 502 disposed thereon. The photovoltaic device also includes a cover element 508 having a graspable tab 510. The cover element 508 can be made from, for example, plastic-coated paper. In the embodiment of the invention shown in FIG. 5, the roofing substrate 520 is a dual-layer asphalt roofing shingle. In the embodiment of the invention shown in FIG. 5, each of the photovoltaic devices has a pair of connectorized electrical cables 522 that remain disposed on top of the roofing substrate 520; they can be connected into an electrical system and covered by a next course of shingles. The skilled artisan will recognize that electrical cables in the photovoltaic elements can be routed in many different ways. For example, the electrical cables can run through a hole in the roofing substrate and be potted in by roofing compound; or they can be integrated into the roofing substrate itself. The photovoltaic element can be attached to the roofing substrate using adhesive, or alternatively they can be screwed, clipped, or nailed to the roofing substrate or to the roof deck, as would be appreciated by the skilled artisan.

In one embodiment of the invention, the roofing substrate is an asphalt roofing shingle. In another embodiment of the invention, the roofing substrate is a plastic tile. In another embodiment of the invention, the roofing substrate is a plastic or metal panel.

In some embodiments of the invention, the high opacity cover element does not cover the entire photovoltaic device. In many situations, an installed photovoltaic device would not have its entire surface presented to the environment, for example because it is partially covered by one or more other photovoltaic devices. This is especially common when the photovoltaic device is constructed to include a roofing substrate such as a roofing shingle, tile, panel, membrane or shake. Such photovoltaic devices would be installed analogously to standard roofing materials, with some overlap between the roofing substrates. Accordingly, it is desirable for only the areas of the photovoltaic device that are ultimately exposed to the environment to be covered by a high opacity cover element, so that the installer can remove all such cover elements only after an entire set of photovoltaic devices is installed. For example, as shown in FIG. 5, the cover element covers only the photovoltaic elements themselves; it does not extend to cover the headlap area of the asphalt shingle. Accordingly, when many such photovoltaic devices are installed on a roof, none of the cover elements would themselves be covered by other photovoltaic devices, and therefore would be easily removable by the installer.

In certain embodiments of the invention, the high opacity cover element has a skid- or slip-resistant surface. For example, the high opacity cover element can have an upper layer of a grit affixed thereon, for example as described in U.S. Pat. No. 5,124,178, which is hereby incorporated herein by reference in its entirety. In another embodiment of the invention, the high opacity cover element has surface relief formed in its top layer, for example using polymer molding or embossing techniques, or has a top surface formed from a skid- or slip-resistant material. A skid- or slip-resistant surface can provide added safety to the installer, as it provides a surface that is less likely to be slick than the surface of the photovoltaic elements.

According to another embodiment of the invention, the cover element comprises an electrochromic material disposed over the active area of the active face of the photovoltaic element. In certain embodiments of the invention, the electrochromic material substantially covers the photovoltaic element. The electrochromic material has at least 25% opacity in the presence of an electric field or in the absence of an electric field (i.e., in its switched on or switched off state). As used herein, an electrochromic material is one that changes its opacity in response to an electric field; it can achieve the change in opacity through any mechanism, such as color change or an increase in scattering. As described in further detail below, the use of an electrochromic material can allow the skilled artisan to passively or actively adjust the photovoltaic power generation of the photovoltaic device in order to balance power output and provide electrical safety during installation and/or repair.

Figure 6:
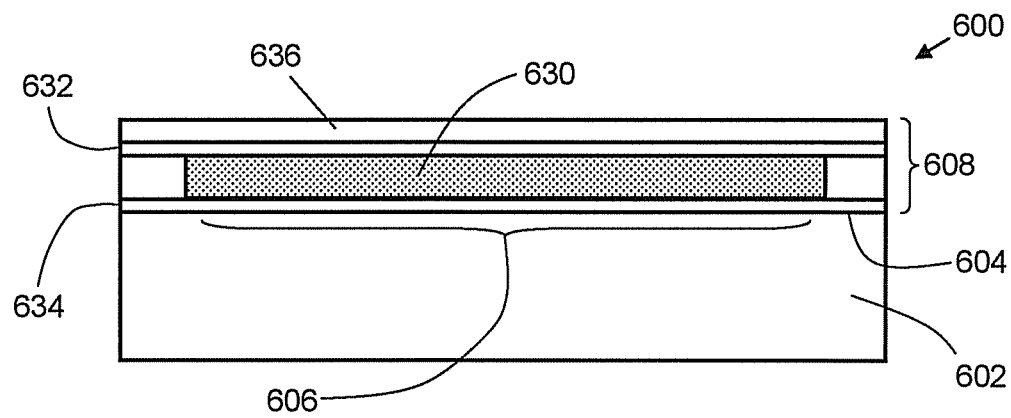
FIG. 6 is a is a schematic cross-sectional view of a photovoltaic device according to one aspect of the invention.

An example of a photovoltaic device according to this embodiment of the invention is shown in cross-sectional view in FIG. 6. Photovoltaic device 600 includes photovoltaic element 602, which has an active face 604 and an active area 606 on its active face 604. The photovoltaic device also includes a cover element 608 on the active face of the photovoltaic element. The cover element includes a top electrode 632, a bottom electrode 634, and an electrochromic material 630 disposed therebetween and substantially covering the active area of the active face of the photovoltaic element. The first and second electrodes can be substantially transparent, and can be made, for example, from materials such as indium tin oxide. As shown in FIG. 6, the cover element can also include a protective layer 636 (e.g., a polymer layer) on top of the top electrode. In this embodiment of the invention, the top and/or bottom electrodes can be electrically connected into a control system configured to adjust the opacity of the electrochromic material, for example by adjusting the voltage difference between the top and bottom electrodes.

According to one embodiment of the invention, the electrochromic material has at least 50% opacity in an electric-field free state and has less than 50% opacity in the presence of an electric field. More desirably, the electrochromic material has at least 75% opacity in an electric-field free state and has less than 25% opacity in the presence of an electric field. Electrochromic materials including liquid crystalline phases are examples of materials suitable for use in this embodiment of the invention.

According to one embodiment of the invention, the electrochromic material has less than 50% opacity in an electric-field free state and has at least 50% opacity in the presence of an electric field. More desirably, the electrochromic material has less than 25% opacity in an electric-field free state and has at least 75% opacity in the presence of an electric field. Electrochromic materials based on ion transfer among multiple layers of ceramic materials, such as those made by SAGE Electrochromics, Inc., are examples of materials suitable for use in this embodiment of the invention.

The use of electrochromic materials can allow the skilled artisan to configure photovoltaic power generation systems that can be switched on or off. An electrical control system can be included in the electrical system into which the photovoltaic devices according to this embodiment of the invention are interconnected. The electrical control system would be interconnected with the top and/or bottom electrodes of the electrochromic materials and could be configured to adjust the opacity of the electrochromic material. For example, the electrical control system can be configured to provide between the top and bottom electrodes both a low-to-no voltage difference and a voltage necessary for switching the electrochromic material between its low- and high-opacity states. The power used to drive the electrical control system could come from the photovoltaic power generation system itself in the form of direct connection and/or storage batteries. The electrical control system could be configured to address individual photovoltaic devices, or groups of individual photovoltaic devices, or alternatively switch all photovoltaic devices in the system. In certain embodiments of the invention the electrical control system is controlled by a system that monitors the electrical performance of the photovoltaic power generation system. If output unexpectedly drops in part of the photovoltaic power generation system, the electrical control system can switch the corresponding electrochromic materials to their high-opacity states, thereby preventing them from generating electricity and providing the repair personnel a greatly reduced electrical hazard while they investigate and repair the fault. In other embodiments of the invention, the electrical control system is configured to provide continuous adjustment of the opacity of the electrochromic material. In this embodiment of the invention, the photovoltaic devices can be tuned so that they operate at or near the maximum power condition of their photovoltaic cells, thereby increasing efficiency and power generation.

In other embodiments of the invention, the electrochromic material is in its low opacity state in the presence of an electric field, and the photovoltaic device provides the power necessary to keep its associated electrochromic material in its low opacity state during normal use. For example, in one such embodiment, the photovoltaic element includes a first electrical lead and a second electrical lead. These electrical leads would be used to connect the photovoltaic device into a photovoltaic power generation system. These electrical leads could take many forms; they can be two separate wires, a single, dual-conductor wire, or even a pair of terminals or system of internal circuitry to which external wires are connected. Alternatively, one of the leads can be an electrical ground. In this embodiment of the invention, the top electrode is electrically connected to the first electrical lead, and the bottom electrode is electrically connected to the second electrical lead. If the photovoltaic element is operating correctly, in the illuminated state there would be a voltage difference between the first and second electrical leads; this voltage difference would be sufficient to sustain the electrochromic material switched in its low opacity state. When the photovoltaic element is in a fault state, there would be very little voltage difference between the first and second electrical leads, and the electrochromic material will revert to its high opacity state. While photovoltaic devices according to this embodiment of the invention would require an external power source to provide the electric field necessary to initially switch their electrochromic materials into their low opacity state, they would otherwise sustain the low opacity state with a fraction of the power generated by the photovoltaic device itself. The external power source can be provided, for example, by a control circuit coupled to a light sensor; when the light sensor senses that the photovoltaic devices have just begun to be illuminated enough to switch their electrochromic materials from high opacity to low opacity, (e.g., at sunrise), the control circuit can provide a pulse of electrical power to the electrochromic materials. The electrochromic materials will switch to their low opacity states and part of the power generated by the photovoltaic device can then sustain that low opacity state.

The photovoltaic devices of the present invention can include a bypass diode that connects the electrical terminals of the photovoltaic element. The bypass diode allows current to flow between the electrical terminals when a fault, a loss of illumination or a malfunction occurs in the photovoltaic cell(s) of the photovoltaic element or photovoltaic roofing element, or when the cover element is in a substantially opaque state. The bypass diode serves to cut a photovoltaic element or photovoltaic roofing element out of the photovoltaic power generation system when it malfunctions, and can also allow for testing of electrical connectivity before the photovoltaic power generation system is activated.

Because the photovoltaic devices of the present invention can be used on a roof, it may be desirable for them to have the properties of a roofing material. Accordingly, in one aspect of the invention the photovoltaic device includes a roofing substrate having a top face and a bottom face, and the photovoltaic element is disposed on or within a roofing substrate. Roofing substrates suitable for use in this aspect of the invention include shingles, tiles, panels, membranes and shakes. As used herein, a photovoltaic device disposed "on" a roofing substrate is disposed on a top surface of the roofing substrate, while a photovoltaic device disposed "within" a roofing substrate is disposed on a bottom or side surface of the roofing substrate, with the active area of its photovoltaic element being exposed to face the same direction as the top surface of the roofing substrate. While the embodiment described with reference to FIG. 5 has a two-layer shingle as its roofing substrate, the skilled artisan will appreciate that more or fewer layers can be used. For example, more layers can help improve stability and help better accommodate the thickness of the photovoltaic element. Additional layers (and partial layers) of shingle material can be used for other purposes, such as to meet aesthetic, mechanical, or weatherproofness requirements. Of course, a single layer of asphalt shingle material can be used as the roofing substrate. In other embodiments of the invention, the roofing substrate is a plastic tile.

In certain embodiments of the invention, the roofing substrate has an exposed area (i.e., not covered by the photovoltaic element) on its top face, and the cover element is attached to the exposed area of the roofing substrate. The exposed area can, for example, at least partially surround the photovoltaic element. As described above, attachment of the cover element to an exposed area on the top face of the roofing substrate can keep the active area of the active face of the photovoltaic element free of adhesive.

The photovoltaic devices of the present invention may be used in a variety of applications. As described above, they can be integrated with roofing substrates to provide photovoltaic roofing elements. However, the person of skill in the art will appreciate that the photovoltaic devices of the present invention can be used in other applications. For example, they can also be used in photovoltaic modules, using, for example, the commonly-used rack-mounted array architecture. The photovoltaic devices of the present invention can be used in any photovoltaic applications, especially those in which installer/repairperson safety, photovoltaic cell temperature and/or adjustability of photovoltaic response is desirable.

The photovoltaic devices described above are generally installed as arrays of photovoltaic devices. Accordingly, another aspect of the invention is an array of photovoltaic devices as described above. The array can include any desirable number of photovoltaic devices, which can be arranged in any desirable fashion. For example, the array can be arranged as partially overlapping, offset rows of photovoltaic devices, in a manner similar to the conventional arrangement of roofing materials. The photovoltaic devices within the array can be electrically interconnected in series, in parallel, or in series-parallel. In one embodiment of the invention, the array of photovoltaic devices is fixed in a frame system similar to that used in conventional rooftop photovoltaic modules.

One or more of the photovoltaic devices described above can be installed on a roof as part of a photovoltaic system for the generation of electric power. Accordingly, one embodiment of the invention is a roof comprising one or more photovoltaic devices as described above disposed on a roof deck. The photovoltaic elements of the photovoltaic devices are desirably connected to an electrical system, either in series, in parallel, or in series-parallel, as would be recognized by the skilled artisan. There can be one or more layers of material, such as underlayment, between the roof deck and the photovoltaic devices of the present invention. The photovoltaic devices of the present invention can be installed on top of an existing roof, in such embodiments, there would be one or more layers of standard (i.e., non-photovoltaic) roofing elements (e.g., asphalt coated shingles) between the roof deck and the photovoltaic devices of the present invention. Electrical connections are desirably made using cables, connectors and methods that meet UNDERWRITERS LABORATORIES and NATIONAL ELECTRICAL CODE standards. Even when the photovoltaic devices include roofing substrates as described above, the roof can also include one or more standard roofing elements, for example to provide weather protection at the edges of the roof, or in any hips, valleys, and ridges of the roof.

Photovoltaic devices of the present invention can be fabricated using many techniques familiar to the skilled artisan. The cover elements can be made, for example, using methods such as doctor blading, laminating, molding, extrusion, vapor deposition, roll coating, curtain coating, spray coating and/or other techniques familiar to the skilled artisan. When making photovoltaic devices including as a roofing substrate an asphalt shingle or an asphalt non-woven glass reinforced laminate, the methods described in U.S. Pat. Nos. 5,953,877; 6,237,288; 6,355,132; 6,467,235; 6,523,316; 6,679,308; 6,715,252; 7,118,794; U.S. Patent Application Publication 2006/0029775; and International Patent Application Publication WO 2006/121433 can be used. Each of the patents and publications referenced above is hereby incorporated herein by reference in its entirety. Photovoltaic devices can be fabricated in a continuous process and then cut into individual elements as is done in the fabrication of asphalt shingles. When a continuous process is used, it can be necessary to individually prepare any electrical cables running between elements, for example by cutting the cables between elements and connectorizing the cut ends.

Another aspect of the invention is a method of installing a roof. The method includes attaching one or more photovoltaic devices to a roof deck, each photovoltaic device comprising a photovoltaic element, a first electrical lead, a second electrical lead, an active face and an operating wavelength range; and a high opacity cover element removably attached to the photovoltaic device and disposed over the active area of the active face of the photovoltaic element. In certain embodiments of the invention, the high opacity cover element substantially covers the active area of the active face of the photovoltaic element. As described above, there can be one or more layers of material between the roof deck and the photovoltaic devices. The method also includes connecting the first electrical lead and the second electrical lead of each photovoltaic element to an electrical system. The electrical system can be formed from, for example, a wiring array as described in U.S. patent application Ser. No. 11/743,073, filed on May 1, 2007 and entitled "Photovoltaic Roofing Wiring Array, Photovoltaic Roofing Wiring System and Roofs Using Them," which is hereby incorporated herein by reference in its entirety. The electrical system might also be formed by connecting the photovoltaic devices in series, and optionally connecting the series-connected groups of photovoltaic devices in parallel. The attaching and connecting can occur in any order, and can be performed at substantially the same time. After the photovoltaic devices are attached to the roof deck and connected to the electrical system, the high opacity cover element is removed from each photovoltaic device. According to this embodiment of the invention, the high opacity cover element can prevent the photovoltaic devices from generating electricity during installation, thereby helping to insure the safety of the installer. Once the photovoltaic devices are installed, the high opacity cover element is removed and power generation begins.

Another aspect of the invention is a method of installing a roof. The method includes attaching one or more photovoltaic devices to a roof deck, each photovoltaic device comprising a photovoltaic element having a first electrical lead, a second electrical lead, an active face and an operating wavelength range; and a cover element comprising an electrochromic material disposed between a first electrode and a second electrode, as described above. The electrochromic material is at least 75% opaque, and more desirably substantially opaque, in the absence of an electric field. As described above, there can be one or more layers of material between the roof deck and the photovoltaic devices. The method also includes connecting the first electrical lead and the second electrical lead of each photovoltaic element to an electrical system. The electrical system can be formed from, for example, a wiring array as described in U.S. patent application Ser. No. 11/743,073, filed on May 1, 2007 and entitled "Photovoltaic Roofing Wiring Array, Photovoltaic Roofing Wiring System and Roofs Using Them," which is hereby incorporated herein by reference in its entirety. The electrical system might also be formed by connecting the photovoltaic devices in series, and optionally connecting the series-connected groups of photovoltaic devices in parallel. The method also includes connecting the first electrode and the second electrode to an electrical control system. The attaching and connecting can occur in any order, and can be performed at substantially the same time, as the skilled artisan would appreciate. After the photovoltaic devices are attached to the roof deck and connected to the electrical system, the cover elements are rendered non-opaque by the application of an electric field through the electrical control system. According to this embodiment of the invention, the electrochromic cover element prevents the photovoltaic devices from generating electricity during installation, thereby helping to insure the safety of the installer. Once the photovoltaic devices are installed, the cover element is rendered non-opaque and power generation begins.

Another aspect of the invention is a photovoltaic system comprising one or more photovoltaic devices, each of which comprises a photovoltaic element and a cover element. As described above, the photovoltaic element includes an active face, an active area on the active face and an operating wavelength range. The cover element is attached to the photovoltaic device and disposed over the active area of the active face of the photovoltaic element. In certain embodiments of the invention, the cover element substantially covers the active area of the active face of the photovoltaic element. The cover element comprises an electrochromic material as described above, as well as a first electrode and a second electrode, with the electrochromic material disposed between them. The electrochromic material has at least 25% opacity in an electric field-free state or in the presence of an electric field. The photovoltaic system also includes an electrical control system connected to each cover element through its first electrode and its second electrode, and configured to adjust the opacity of the electrochromic material. The adjustment of the opacity of the electrochromic material is achieved, for example, by changing the potential difference between the electrodes. The electrical control system can be designed to provide a continuous adjustment of the opacity of the electrochromic material, or alternatively to switch only between a high-opacity state and a low-opacity state. In certain embodiments of the invention, the electrical control system is configured to addressably switch or adjust the electrochromic material of each photovoltaic device individually. In other embodiments of the invention, the electrical switching system adjusts or switches all photovoltaic devices at once, or is configured to address groups of photovoltaic devices (e.g., all photovoltaic devices in a given series of a series-parallel connected photovoltaic power generation system). The electrical control system can be controlled manually, or can be automatically controlled by a computing system. The photovoltaic system according to this embodiment of the invention can be used to switch off photovoltaic power generation to allow workers to safely work on a roof. In embodiments having continuous adjustability, the photovoltaic system according to this embodiment of the invention can tune the photovoltaic devices so that they operate at or near the maximum power condition of their photovoltaic cells, thereby maximizing efficiency and power generation.

Another embodiment of the invention provides a roof comprising the photovoltaic system according to this aspect of the invention attached to a roof deck.

It will be apparent to those skilled in the art that various modifications and variations can be made to the present invention without departing from the scope of the invention. Thus, it is intended that the present invention cover the modifications and variations of this invention provided they come within the scope of the appended claims and their equivalents.

What is claimed is:

1. A photovoltaic roofing element comprising:
   an asphalt shingle or metal roofing substrate having a top face and a bottom face;
   a photovoltaic element having an active face, an active area on the active face and an operating wavelength range, the photovoltaic element being disposed on the top face of the asphalt shingle or metal roofing substrate; and
   a cover element disposed over the active area of the active face of the photovoltaic element, the cover element comprising an electrochromic material, a first electrode and a second electrode, wherein the first electrode and second electrode are above the photovoltaic element, wherein the electrochromic material is disposed between the first electrode and the second electrode, and wherein the electrochromic material has at least 25% opacity within the operating wavelength range of the photovoltaic element in the presence of an electric field or in the absence of an electric field.

2. The photovoltaic roofing element of claim 1, wherein the electrochromic material includes a liquid crystalline phase.

3. The photovoltaic roofing element of claim 1, wherein the electrochromic material has at least 50% opacity within the operating wavelength range of the photovoltaic element in an electric-field free state and has less than 50% opacity within the operating wavelength range in the presence of an electric field.

4. The photovoltaic roofing element of claim 1, wherein the electrochromic material has less than 50% opacity within the operating wavelength range of the photovoltaic element in an electric-field free state and has at least 50% opacity within the operating wavelength range in the presence of an electric field.

5. The photovoltaic roofing element according to claim 1, disposed on a roof deck.

6. The photovoltaic roofing element of claim 1, wherein the electrochromic material has at least 75% opacity within the operating wavelength range of the photovoltaic element in an electric-field free state and has less than 25% opacity within the operating wavelength range in the presence of an electric field.

7. The photovoltaic roofing element of claim 1, wherein the electrochromic material has less than 75% opacity within the operating wavelength range of the photovoltaic element in an electric-field free state and has at least 25% opacity within the operating wavelength range in the presence of an electric field.

8. The photovoltaic roofing element according to claim 1, connected into a photovoltaic power generation system.

9. The photovoltaic roofing element according to claim 1, configured to power one or more devices.

10. The photovoltaic roofing element according to claim 1, wherein the first electrode and the second electrode of the cover element are connected to an electrical switching system configured to adjust the opacity of the electrochromic material.

11. A photovoltaic power generation system comprising:
one or more photovoltaic roofing elements, each photovoltaic roofing element comprising
- an asphalt shingle or metal roofing substrate having a top face and a bottom face;
- a photovoltaic element disposed on the top face of the asphalt shingle or metal roofing substrate, the photovoltaic element having an active face and an operating wavelength range; and
- a cover element disposed over the active face of the photovoltaic element, the cover element comprising an electrochromic material, a first electrode and a second electrode, wherein the first electrode and second electrode are above the photovoltaic element, wherein the electrochromic material is disposed between the first electrode and the second electrode, and wherein the electrochromic material has at least 25% opacity within the operating wavelength range of the photovoltaic element in an electric field-free state or in the presence of an electric field; and
an electrical switching system connected to each cover element through its first electrode and second electrode, and configured to adjust the opacity of the electrochromic material of each photovoltaic roofing element.

12. The photovoltaic power generation system of claim 11, wherein the electrical switching system is configured to addressably adjust the electrochromic material of each photovoltaic roofing element individually.

13. A roof comprising the photovoltaic power generation system of claim 11 attached to a roof deck.

14. The photovoltaic power generation system of claim 11, wherein the electrical switching system is controlled by a system configured to monitor the electrical performance of the photovoltaic power generating system.

15. The photovoltaic power generation system of claim 11, wherein the electrochromic material of each photovoltaic roofing element has at least 75% opacity within the operating wavelength range of the photovoltaic element in an electric-field free state and has less than 25% opacity within the operating wavelength range in the presence of an electric field.

16. The photovoltaic device of claim 11, wherein the electrochromic material of each photovoltaic roofing element has less than 75% opacity within the operating wavelength range of the photovoltaic element in an electric-field free state and has at least 25% opacity within the operating wavelength range in the presence of an electric field.

17. The photovoltaic power generation system according to claim 11, configured to power one or more devices.

\* \* \* \* \*